(12) United States Patent
Jarvis et al.

(10) Patent No.: US 10,640,652 B2
(45) Date of Patent: May 5, 2020

(54) METHOD FOR INCREASING THE PARTICLE SIZE OF AMMONIUM OCTAMOLYBDATE (AOM)

(71) Applicant: DataLase Ltd., Widnes Cheshire (GB)

(72) Inventors: Anthony Jarvis, Widnes (GB); William Green, Widnes (GB); Martin Walker, Widnes (GB)

(73) Assignee: DATALASE LTD., Widnes Cheshire (GB)

( * ) Notice: Subject to any disclaimer, the term of this patent is extended or adjusted under 35 U.S.C. 154(b) by 76 days.

(21) Appl. No.: 15/529,322

(22) PCT Filed: Nov. 24, 2015

(86) PCT No.: PCT/GB2015/053574
§ 371 (c)(1),
(2) Date: May 24, 2017

(87) PCT Pub. No.: WO2016/083794
PCT Pub. Date: Jun. 2, 2016

(65) Prior Publication Data
US 2017/0275469 A1    Sep. 28, 2017

(30) Foreign Application Priority Data

Nov. 24, 2014 (GB) .................. 1420831.8

(51) Int. Cl.
| | | |
|---|---|---|
| *C09C 1/00* | (2006.01) | |
| *C01G 39/00* | (2006.01) | |
| *C09D 11/037* | (2014.01) | |
| *C09D 11/107* | (2014.01) | |
| *B41M 1/00* | (2006.01) | |
| *B41M 1/04* | (2006.01) | |

(52) U.S. Cl.
CPC ............. *C09C 1/0003* (2013.01); *B41M 1/00* (2013.01); *B41M 1/04* (2013.01); *C01G 39/00* (2013.01); *C01G 39/006* (2013.01); *C09D 11/037* (2013.01); *C09D 11/107* (2013.01); *C01P 2004/52* (2013.01); *C01P 2004/54* (2013.01); *C01P 2004/61* (2013.01); *C01P 2004/62* (2013.01)

(58) Field of Classification Search
None
See application file for complete search history.

(56) References Cited

U.S. PATENT DOCUMENTS

| | | | |
|---|---|---|---|
| 3,973,948 A | 8/1976 | Laferty, Jr. et al. | |
| 4,762,700 A | 8/1988 | Huggins | |
| 9,290,664 B2 | 3/2016 | Cottrell et al. | |
| 2014/0371063 A1* | 12/2014 | Jarvis | B41M 5/42 503/201 |
| 2015/0148470 A1* | 5/2015 | Cottrell | C09C 1/0003 524/406 |

FOREIGN PATENT DOCUMENTS

| | | |
|---|---|---|
| CN | 102060329 | 5/2011 |
| CN | 102583542 | 7/2012 |
| EP | 0015496 A2 | 9/1980 |
| EP | 1115653 B1 | 11/2005 |
| EP | 1657072 A2 | 5/2006 |
| JP | Showa 50-1999 | 1/1975 |
| JP | 2008518095 | 5/2008 |
| WO | 2013098075 A1 | 7/2013 |

OTHER PUBLICATIONS

International Search Report/Written Opinion, International Application No. PCT/GB2015/053574, PCT/ISA/210, PCT/ISA/237, dated Jan. 29, 2016.

* cited by examiner

*Primary Examiner* — Joshua D Zimmerman
(74) *Attorney, Agent, or Firm* — Saliwanchik, Lloyd & Eisenschenk

(57) ABSTRACT

Methods of increasing the particle size of ammonium octamolybdate (AOM) pigment powder are provided. A method can include heating the AOM pigment powder to a temperature above 20° C. for a given amount of time. An ink composition can be produced by formulating AOM pigment powder with increased particle size and incorporating the AOM pigment powder into an ink composition.

16 Claims, No Drawings

METHOD FOR INCREASING THE PARTICLE SIZE OF AMMONIUM OCTAMOLYBDATE (AOM)

CROSS-REFERENCE TO RELATED APPLICATIONS

This application is a national stage application of International Patent Application No. PCT/GB2015/053574, filed Nov. 24, 2015, which claims priority to Great Britain Application No. 1420831.8, filed Nov. 24, 2014, the disclosures of each of which are incorporated herein by reference in their entirety, including any figures, tables, and drawings.

FIELD OF THE INVENTION

This invention relates to a method for increasing the particle size of ammonium octamolybdate.

BACKGROUND OF THE INVENTION

Ammonium octamolybdate (AOM) is known primarily as a fire-retardant. The ability to use AOM to form an image on a substrate is disclosed in WO2002/074548.

Ammonium octamolybdate (AOM) is a pigment that undergoes a white to black colour change reaction on exposure to laser irradiation. It has become widely used in substrate coding and marking applications using lasers.

Freshly made AOM pigment powder typically comprises a large proportion of relatively small particles, known as 'fines'. The presence of these fines is reflected in the DX values of the AOM pigment powder, where X is the percentage of particles below the quoted size, usually in microns.

With AOM pigment powder the consequence of the presence of a relatively large number of fines is it can adversely affect the rheological properties of any formulation subsequently made using the AOM pigment powder, such as liquid coatings, printing inks or plastic masterbatches.

In order to apply AOM pigment to a substrate for laser based coding and marking, such as those used in the manufacture of primary or secondary packaging, it must first be formulated into a liquid coating formulation or printing ink. The ink is then applied to the substrate using a standard industrial coating technique.

It has been observed that AOM pigment, when tested shortly after its manufacture, can give rise to liquid coatings or printing inks with rheological properties far from ideal. Usually the coating rheology is such that the liquid formulation is too thick. With liquid coatings/printing inks there is an ideal rheology window for application to a substrate. Optimum laser imaging performance requires the liquid coating/printing ink to have a specific minimum concentration of AOM pigment powder. Too little pigment causes laser imaging performance to be diminished. Too much pigment can adversely affect laser imaging performance by rendering the liquid coating/printing inks with poor rheological properties which reduces ink transfer during printing. Also having to use more pigment than is usually necessary makes the process less economically attractive.

For a given concentration of AOM pigment powder if the coating/ink is too thick the coating/ink cannot readily flow or transfer from the printing press to the substrate. This can be remedied by dilution with solvent. However, this causes the active pigment concentration to be diluted resulting in less pigment actually being transferred to the substrate resulting in diminished laser imaging performance. This is critical in applications requiring high contrast such as barcode readability. If the ink is too thin not enough will transfer and laser imaging performance will be diminished.

We have observed that the particle size of AOM pigment power can naturally increase with time. However, this process can take up to and over 12 months to fully complete. It is costly and impractical to hold large stocks of AOM pigment for such a relatively long time in an industry based on fast turnaround products.

SUMMARY OF THE INVENTION

In accordance with a first aspect of the invention there is provided a method of increasing the particle size of AOM pigment powder, comprising heating the AOM pigment powder to a temperature (k1) above 20° C. for a given amount of time, t1.

In accordance with a second aspect of the invention there is provided a method of producing an ink composition comprising formulating AOM pigment powder according to the method of the first aspect of the invention and incorporating this into an ink composition.

In accordance with a third aspect of the invention there is provided an ink composition obtainable from the method of the second aspect of the invention.

In accordance with a fourth aspect of the invention there is provided a method for providing an image on a substrate, which comprises applying to the substrate a composition according to the third aspect of the invention, followed by irradiation.

The method of the invention has been advantageously shown to mimic what happens naturally when AOM is stored over time, but at a much faster rate. Ink compositions of the invention have reduced viscosity and therefore are more useful in imaging applications. Without being bound by theory, it is thought that the method of the invention causes a reduction in the number of fines present, i.e. very small particles in the AOM pigment are thought to dissolve and stick together, thus reducing the viscosity.

DESCRIPTION OF PREFERRED EMBODIMENTS

Particle Size

Freshly made AOM pigment powder is known to typically comprise many relatively small particles or fines, but also to comprise a bimodal particle size distribution. In order to create coatings and inks with good rheological properties it is preferred that the AOM pigment powder comprises fewer fines and also has a more monomodal particle size distribution.

Particle size can be measured using any applicable technique such as: sieving, light scattering, sedimentation, image analysis or a Coulter counter. Particle sizes are typically measured using a laser diffraction particle size analyzer.

The D10 particle size is the size below which 10% of the particles in the sample are smaller. The conditioning treatment of the present invention preferably yields a D10 of at least 0.4 microns, more preferably at least 0.6 microns and even more preferably still at least 0.8 microns.

The D50 particle size is the size below which 50% of the particles in the sample are smaller. The conditioning treatment of the present invention preferably yields a D50 of at least 1.6 microns, more preferably at least 2.0 microns and even more preferably still at least 2.4 microns.

The D90 particle size is the size below which 90% of the particles in the sample are smaller. The conditioning treatment of the present invention preferably yields a D90 of at least 5.6 microns, more preferably at least 6.0 microns and even more preferably still at least 6.4 microns.

The D99 particle size is the size below which 99% of the particles in the sample are smaller. The conditioning treatment of the present invention preferably yields a D99 of at least 10.0 microns, more preferably at least 10.2 microns and even more preferably still at least 10.4 microns.

The most preferred particle size distribution is monomodal. Bimodal systems whereby the difference between the two peak heights is relatively large are much preferred over those where it is relatively small.

It has been surprisingly found that AOM pigment can be conditioned and the number of fines reduced and a more monomodal particle size distribution obtained and the subsequent rheological properties of water based printing inks significantly improved using a process that takes at most a few days. This process involves storing the AOM pigment at an elevated temperature above 20° C., preferably above 30° C. and most preferably in the range 30 to 60° C., for a given length of time. The given length of time is preferably at least 4 hours, and is most preferably in the range 4 to 240 hours. The AOM pigment can be heated in a sealed or open container or on a tray. It is preferred that the AOM pigment powder is heated in a sealed/air tight container.

It has been surprisingly found that the rheological properties can be further improved by cooling the AOM pigment for a given length of time either after or preferably prior to storage at elevated temperature. Even much more surprisingly still the rheological properties can be still further improved by cooling the AOM pigment in an open container thereby exposing the pigment powder directly to the cool atmosphere for a given length of time prior to storage at elevated temperature.

The AOM pigment is stored for a given length of time below 20° C., most preferably below 10° C. and is typically stored the range 2 to 8° C. The given length of time is preferably at least 4 hours, most preferably in the range 4 to 240 hours. The AOM pigment can be cooled in a sealed/air tight or open container or on a tray. It is preferred that the AOM pigment powder is exposed directly to the cool atmosphere using either an open container or tray, for all or at least some part of its cool storage. The cool atmosphere preferably has a relative humidity in the range 40 to 100%, more preferably 70 to 80%. It is most preferred that the AOM pigment powder is initially stored at the low temperature, k2, in a sealed container, to allow the pigment to cool to ambient temperature. Typically this step takes 24 to 48 hours. Thereafter, preferably the container is opened and the pigment is exposed to the external atmosphere for the remainder of the cooling time, typically a further 24 to 48 hours.

Once incorporated into the ink composition, the rheological properties of this can be tested using means known in the art. For instance, the AOM pigment is made into a typical water based flexographic printing ink at a pigment loading of more than 50%, typically around 55%. This loading level is required to generate high optical density images, e.g. suitable for barcodes. Important rheological properties of this ink are:

1. Initial ink flow: as measured using a Zahn number 2 flow cup at 20° C. Ideally this is in the range 20 to 28 seconds.

2. Residual initial ink quantity: ink remaining in the Zahn number 2 flow cup upon cessation of flow. Ideally there should be essentially negligible ink remaining in the flow cup upon cessation of flow.

3. Reduction factor: the amount of water needed to reduce the ink to a flow of 20 seconds, Zahn number cup at 20° C. Ideally this is less than or equal to 5%.

The initial ink flow and reduction factor are usually related. The higher the initial flow usually the more water is required to reduce it to print viscosity. This results in the print viscosity ink having a decreased pigment concentration giving rise to paler laser images.

Residual initial ink quantity is a good indication of the rheological properties of an ink. An ink with good rheology would generally leave only a thin coating on the walls of the Zahn flow cup upon cessation of flow. An ink with poor rheology will leave a significant and measurable quantity of the ink in the flow cup upon cessation of flow.

The ink at print viscosity (20 seconds Zahn 2 at 20° C.) can then be applied to a paper based substrate using a flexographic printing technique to deliver a dry coatweight approximately 6±2 grams per square metre.

The invention also provides ink compositions obtainable by the method of the invention. These may have the additional properties as outlined below.

Binders

AOM pigment of the present invention may be formulated into a composition that preferably comprises a binder. The binder can be any suitable binder used by the ink/coatings industry. Preferably, the binder is a polymeric binder. Examples of polymeric binders are acrylic polymers, styrene polymers and hydrogenated products thereof, vinyl polymers, polyolefins and hydrogenated or epoxidized products thereof, aldehyde polymers, epoxide polymers, polyamides, polyesters, polyurethanes, sulfone-based polymers and natural polymers and derivatives thereof. The polymeric binder can also be a mixture of polymeric binders.

Acrylic polymers are polymers formed from at least one acrylic monomer or from at least one acrylic monomer and at least one styrene monomer, vinyl monomer, olefin monomer and/or maleic monomer. Examples of acrylic monomers are acrylic acid or salts thereof, acrylamide, acrylonitrile, $C_{1-6}$-alkyl acrylates such as ethyl acrylate, butyl acrylate or hexyl acrylate, $di(C_{1-4}$-alkyl-amino$)C_{1-6}$-alkyl acrylates such as dimethylaminoethyl acrylate or diethylaminoethyl acrylate and $C_{1-4}$ alkyl halide adducts thereof such as dimethylaminoethyl acrylate methyl chloride, amides formed from $di(C_{1-4}$-alkylamino$)C_{1-6}$-alkylamines and acrylic acid and $C_{1-4}$-alkyl halide adducts thereof, methacrylic acid or salts thereof, methacrylamide, methacrylonitrile, $C_{1-6}$-alkyl methacrylates such as methyl methacrylate or ethyl methacrylate, $di(C_{1-4}$-alkylamino$)C_{1-6}$-alkyl methacrylates and $C_{1-4}$-alkyl halide adducts thereof, amides formed from $di(C_{1-4}$-alkylamino$)C_{1-6}$-alkylamines and methacrylic acid and $C_{1-4}$-alkyl halide adducts thereof and crosslinkers such as N,N'-methylenebisacrylamide.

Examples of styrene monomers are styrene, 4-methylstyrene and 4-vinylbiphenyl. Examples of vinyl monomers are vinyl alcohol, vinyl chloride, vinylidene chloride, vinyl isobutyl ether and vinyl acetate. Examples of olefin monomers are ethylene, propylene, butadiene and isoprene and chlorinated or fluorinated derivatives thereof such as tetrafluroethylene. Examples of maleic monomers are maleic acid, maleic anhydride and maleimide. Examples of acrylic polymers are poly(methyl methacrylate), poly(butyl methacrylate) and styrene acrylic polymers.

Styrene polymers are polymers formed from at least one styrene monomer and at least one vinyl monomer, olefin monomer and/or maleic monomer. Examples of styrene monomers, vinyl monomers, olefin monomers and maleic monomers are given above. Examples of styrene polymers are styrene butadiene styrene block polymers, styrene ethylene butadiene block polymers, styrene ethylene propylene styrene block polymers.

Vinyl polymers are polymers formed from at least one vinyl monomer or from at least one vinyl monomer and at least one olefin monomer or maleic monomer. Examples of vinyl monomers, olefin monomers and maleic monomers are given above. Examples of vinyl polymers are polyvinyl chloride and polyvinyl alcohol.

Polyolefins are polymers formed from at least one olefin monomer. Examples of olefin monomers are given above. Examples of polyolefins are polyethylene, polypropylene and polybutadiene. Aldehyde polymers are polymers formed from at least one aldehyde monomer or polymer and at least one alcohol monomer or polymer, amine monomer or polymer and/or urea monomer or polymer. Examples of aldehyde monomers are formaldehyde, furfural and butyral. Examples of alcohol monomers are phenol, cresol, resorcinol and xylenol. An example of polyalcohol is polyvinyl alcohol. Examples of amine monomers are aniline and melamine. Examples of urea monomers are urea, thiurea and dicyandiamide. An example of an aldehyde polymer is polyvinyl butyral formed from butyral and polyvinyl alcohol.

Epoxide polymers are polymers formed from at least one epoxide monomer and at least one alcohol monomer and/or amine monomer. Examples of epoxide monomers are epichlorhydrin and glycidol. Examples of alcohol monomers are phenol, cresol, resorcinol, xylenol, bisphenol A and glycol. An example of epoxide polymer is phenoxy resin, which is formed from epichlorihydrin and bisphenol A.

Polyamides are polymers formed from at least one monomer having an amide group or an amino as well as a carboxy group or from at least one monomer having two amino groups and at least one monomer having two carboxy groups. An example of a monomer having an amide group is caprolactam. An example of a diamine is 1,6-diaminohexane. Examples of dicarboxylic acids are adipic acid, terephthalic acid, isophthalic acid and 1,4-naphthalenedicarboxylic acid. Examples of polyamides are poyhexamethylene adipamide and polycaprolactam.

Polyesters are polymers formed from at least one monomer having an hydroxy as well as a carboxy group or from at least one monomer having two hydroxy groups and at least one monomer having two carboxy groups or a lactone group. An example of a monomer having a hydroxy as well as a carboxy group is adipic acid. An example of a diol is ethylene glycol. An example of a monomer having a lactone group is carprolactone. Examples of dicarboxylic acids are terephthalic acid, isophthalic acid and 1,4-naphthalenedicarboxylic acid. An example of a polyester is polyethylene terephthalate. So-called alkyd resins are also regarded as belonging to polyester polymers. Polyurethane are polymers formed from at least one diisocyanate monomer and at least one polyol monomer and/or polyamine monomer.

Examples of diisocyanate monomers are hexamethylene diisocyanate, toluene diisiocyanate and diphenyl methane diisocyanate.

Examples of sulfone-based polymers are polyarylsulfone, polyethersulfone, polyphenyl-sulfone and polysulfone. Polysulfone is a polymer formed from 4,4-dichlorodiphenyl sulfone and bisphenol A.

Natural polymers can be a cellulose, natural rubber or gelatin. Examples of cellulose derivatives are ethyl cellulose, hydroxypropyl cellulose, nitrocellulose, cellulose acetate and cellulose propionate.

The polymeric binders are known in the art and can be produced by known methods. The polymeric binder can be also produced in situ by UV radiation of a composition comprising monomers, capable of radical polymerisation, and a UV-sensitive initiator.

Preferred polymeric binders are acrylic polymers, vinyl polymers, aldehyde polymers, epoxide polymers, polyamides, polyesters and natural polymers and derivatives thereof. More preferred polymeric binders acrylic polymers, vinyl polymers, natural polymers and derivatives thereof.

Even more preferred polymeric binders are poly(methyl methacrylate), poly(butyl methacrylate), polyvinyl alcohol and cellulose. The most preferred polymeric binder is poly(methyl methacrylate).

Further examples include 'core-shell' type polymers such as those comprising a styrene-acrylic acid copolymer and a styrene/ethylhexyl acrylate copolymer, a styrene/butadiene copolymer or a vinyl acetate/crotonic acid copolymer.

The binder in a liquid ink/coating system can be in the form of a solution or emulsion.

Solvents

The composition comprising the AOM and binder of the present invention can also comprise a solvent. The solvent can be water, an organic solvent or mixtures thereof. Preferably the solvent is water.

Examples of organic solvents are $C_{1-4}$-alkyl acetates, $C_{1-4}$-alkanols, $C_{2-4}$-polyols, $C_{3-6}$-ketones, $C_{4-6}$-ethers, nitromethane, dimethylsulfoxide, dimethylformamide, dimethyl-acetamide, N-methylpyrolidone and sulfolane, whereby $C_{1-4}$-alkanols and $C_{2-4}$-polyols may be substituted with $C_{1-4}$-alkoxy. Examples of $C_{1-4}$-alkyl acetates are methyl acetate, ethyl acetate and propyl acetate, isopropyl acetate and butyl acetate. Other examples include: 2-methoxy-1-methylethyl acetate and 2-ethoxy-1-methylethyl acetate. Examples of $C_{1-4}$-alkanols are methanol, ethanol, propanol, isopropanol or butanol, isobutanol, sec-butanol and tert-butanol. Other examples of suitable alcohol are aromatic alcohols such as: benzyl alcohol. Examples of a $C_{1-4}$-alkoxy-derivatives thereof are 2-ethoxyethanol and 1-methoxy-2-propanol. Examples of $C_{2-4}$-polyols are glycol and glycerol. Examples of $C_{3-6}$-ketones are acetone, methyl ethyl ketone and cyclic ketones such as: cyclohexanone and lactones such as: 4-butyrolactone. Examples of $C_{4-6}$-ethers are dimethoxyethane and diisopropylethyl, cyclic ethers such as: tetrahydrofuran, glycol ethers such as diethylene glycol, glycol ether esters and dialkyl glycol ethers. An example of a $C_{2-3}$-nitrile is acetonitrile. Other solvents include straight, branched and cyclic hydrocarbons including aliphatics such as: heptane, hexane and cyclohexane; and aromatics such as: solvent naphtha (petroleum) light aromatic, toluene, xylenes and ethyl benzene.

More preferably, the solvent is water, a $C_{1-4}$-alkanol, for example ethanol, a $C_{1-4}$-alkyl acetate, for example ethyl or propyl acetate, or mixtures thereof, or a $C_{3-6}$-ketone such as acetone or methyl ethyl ketone.

Inks

A composition of the present invention comprising the AOM pigment and binder can be an ink or surface coating formulation. The ink formulation can be a flexographic, gravure, offset, litho, pad or screen printing ink. The ink formulation can be aqueous or solvent based. Another type of ink that the AOM of the present invention is particularly suited for are UV flexo inks. These are inks that usually comprise photo-initiators and resins. The substrate coated with a UV flexo ink is exposed to UV light and a chemical reaction takes place during which the photo-initiators cause the ink components to cross-link into a solid, thereby hardening/curing or drying the ink. The ink comprising the AOM of the present invention can also be electron-beam cured or chemically cured.

The AOM can also be included into a 'masterbatch concentrate' formulation from which coating/ink compositions for laser imaging substrates can be subsequently manufactured. Examples of these systems are taught in WO2013/192307.

Other Additives

The composition of the present invention comprising AOM and a binder can also comprise other additives. Examples include: polymers, light/energy-absorbing agents, UV-absorbers such as 2-hydroxy-4-methoxybenzophenone, surfactants, waxes, silicones, wetting agents, foam control agents, drying promoters, colourants such as traditional dyes and pigments, fluorescent agents, plasticisers, optical brighteners, oxidizing or reducing agents, stabilizers, light stabilizing agents such as hindered amines, rheology modifiers such as thickening agents such as silica, thinning agents, thixotropy modifiers, dispersing agents, humectants, solvents, adhesion promoters, acid or base-generating agents, acid or base-scavenging agents, opaciferers or retarders.

Substrates

Other aspects of the invention are a method of coating a substrate with a product of the present invention, and the coated substrate. The substrate can be a sheet or any other three-dimensional object and it can be transparent or opaque. The substrate can be cellulose fibre based such as: paper, corrugated fiberboard, cardboard and cartonboard; metal; metallic foil; wood; textiles; leather; glass; ceramics and/or polymers. Examples of polymers are polyethylene terephthalate, low density-polyethylene, polypropylene, biaxially orientated polypropylene, polyether sulfone, polyvinyl chloride, polyester and polystyrene. Preferably, the substrate is made from paper, corrugated fiberboard, cardboard or polymeric film. Also preferably, the substrate is a flexible polymer film made from polyethylene terephthalate, low density-polyethylene, polypropylene, biaxially orientated polypropylene, polyether sulfone, polyvinyl chloride or cellulosic films. The substrate can also be a ridged plastic object, a foodstuff or pharmaceutical preparation.

The thickness of the coating usually chosen is in the range of 0.1 to 1000 microns. Preferably, it is in the range of 1 to 500 microns. More preferably, it is in the range of 1 to 200 microns. Most preferably, it is in the range of 5 to 150 microns.

The substrate can be coated with a composition of the present invention by using a standard coating application such as a bar coater application, rotation application, spray application, curtain application, dip application, air application, knife application, screen, blade application or roll application.

Where the composition of the present invention is a liquid ink formulation it can be applied to substrates using any known printing method. Examples include offset, intaglio, flexographic, gravure, UV flexo, pad printing, screen printing and the like.

The coating composition can be dried, for example at ambient or elevated temperature or via energy curing such as UV or electron beam.

Plastics

The AOM pigment powder of the present invention can also be used in the laser marking of plastics, particularly thermoplastics, wherein the AOM pigment powder has been directly incorporated into the plastic using a high temperature melt processing procedure such as injection moulding or extrusion.

Lasers/Laser Systems

Also part of the invention is a process for preparing a marked substrate, which comprises the steps of i) coating a substrate with the composition of the present invention, and ii) exposing those parts of the coated substrate, where a marking is intended, to energy in order to generate a colour marking.

The energy can be heat or any other energy, which is transformed into heat when applied to the substrate coated with the composition of the present invention. Examples of such energy are UV, IR which include near and mid-IR or microwave irradiation.

The energy can be applied to the coated substrate in any suitable way, for example heat can be applied by using a thermal printer, such as those that comprise a thermal print head that contacts the substrate. The energy can also be in the form of electromagnetic radiation or light, preferably in the wavelength range 100 nm to 32 microns. The light can be coherent or non-coherent, broadband or monochromatic. UV, visible and IR irradiation can be applied by using UV, visible or IR light sources such as lamps, bulbs and diodes, or more preferably lasers. Lasers can be pulsed or continuous wave emitters. Examples of IR lasers are $CO_2$ lasers that emit in the mid-infrared, Nd:YAG or fibre lasers and IR semiconductor lasers that emit in the near infrared. Preferably, the energy is IR irradiation. More preferably, the energy is IR irradiation having a wavelength in the range of 700 nm to 20 microns. Most preferably, the energy is IR irradiation such as that generated by a mid-infrared $CO_2$ laser or that generated by a near infrared Nd:YAG laser. Semi-conductor diode lasers also suitable for example: AlGaInP, AlGaAs or InGaAsP based systems. UV laser radiation in the wavelength range 100 nm to 405 nm is also suitable. The light can be emitted from a single source or multiple sources, such as in a diode array, laser array or laser diode array system.

Other Colour Change Chemistries

The composition of the present invention can also comprise other colour change chemistries. Examples include other metal oxyanions, leuco dyes with or without an additional colour developer, charge transfer agents and charrable agents and poly-yne compounds.

Plastics Imaging

The composition of the present invention is also particularly suitable for use in the imaging, coding and marking of plastics, particularly with lasers. To do this the AOM of the present invention is dispersed within the bulk of the plastics. The AOM of the present invention can be applied to the plastics as a powder, or via a liquid or solid masterbatch. A suitable liquid masterbatch comprises the AOM of the present invention dissolved, or preferably dispersed, into a polymer compatible liquid vehicle. Suitable liquid vehicles include but are not limited to vegetable or mineral oils. Preferably the liquid vehicle is compatible with both the AOM of the present invention and the plastics. A suitable solid masterbatch comprises the AOM of the present invention dissolved, or preferably dispersed in a solid plastics. Plastics suitable for use in preparation of a solid masterbatch comprising AOM of the present invention include, but are not limited to, carriers such as: HDPE, LDPE, LLDPE, PPHP, PPCP, ABS, SAN, GPPS, HIPS, PC, PA, POM, PMMA, PBT/PET and PVC. The AOM of the present invention can be applied to plastics in combination with other additives such as colourants, toners, UV absorbers, light stabilizing agents, reheat agents, nucleators, clarifiers, anti-acetaldehyde agents, anti-slip agents, delustrants, pearlescent and metallic effect pigments and oxygen scavengers. The AOM of the present invention can be applied to the plastic using methods such as injection moulding, blow moulding, profile extrusion, sheet extrusion and film extrusion application methods.

Energy/Light-Absorbing Agents

The composition of the present invention can also comprise an energy or light-absorbing agent. These can absorb light in the region 100 nm to 32 microns. Particularly preferred are compounds that absorb in the near infrared region of the spectrum (700 nm to 2500 nm). The compounds are known as NIR absorbers. Any suitable NIR absorber can be used. It is even more preferred still if the absorbance profile or λmax of the NIR absorber approximately matches the emission wavelength(s) of the NIR light source or laser used to image the substrate. Also preferred are NIR absorbers that have negligible impact on the background colour of the substrate. The most preferred NIR absorbers include: 1) inorganic copper salts such as copper (II) hydroxyl phosphate; 2) organic NIR dyes and pigments, such as N,N,N,'N'-tetrakis(4-dibutylaminophenyl)-p-benzoquinone bis(iminium hexafluoroantimonate); 3) non-stoichiometric inorganic compounds, such as reduced indium tin oxide, reduced zinc oxide, reduced tungsten oxides, metal tungsten bronzes such as cesium tungsten bronze, reduced antimony tin oxide; also included in this are doped metal oxides such as AZO and FTO; and 4) conductive polymers such as PEDOT and the like.

Other energy-absorbing additives include UV absorbers, visible light absorbers and mid-infrared absorbers particularly those that can improve imaging with a $CO_2$ laser. Examples include mica and mica based compounds such as ATO-coated micas known as Iriodin products.

The following Examples illustrate the invention.

EXAMPLES

Cool treatment was performed using a walk-in cold store fridge set to an operating temperature in the range 4-8° C.

Heat treatment was performed using a walk-in heated chemical store set to an operating temperature in the range 40-50° C.

Particle size distribution was measured using a laser diffraction particle size analyzer.

6 different samples of AOM pigment were prepared as followed from the same batch of AOM pigment starting material:

AOM Pigment Sample 1—Untreated.
D10=0.37; D50=1.30; D90=5.54; D99=9.67; with distinct bimodal distribution.

AOM Pigment Sample 2—Fridge only treated in a sealed container, untreated AOM cooled at 6±2° C. for 96 hours in a sealed container throughout. No heat treatment.

AOM Pigment Sample 3—Fridge only treated in an open container, untreated AOM cooled at 6±2° C. for 96 hours in an open container throughout. No heat treatment.

The particle sizes of samples 2 and 3 were not measured as their rheological properties were no better than the untreated sample.

AOM Pigment Sample 4—Heat only treated AOM, untreated AOM heat treated in a sealed container for 120 hours at 45±5° C. No cool treatment.
D10=0.71; D50=2.77; D90=6.41; D99=10.23; with distinctly reduced bimodal distribution.

AOM Pigment Sample 5—Cooled and heat treated AOM sealed, untreated AOM cooled at 6±2° C. for 96 hours. The cooled AOM Pigment was then heat treated at 45±5° C. for 96 hours, in a sealed container throughout.

AOM Pigment Sample 6—Cooled and heat treated AOM part open then sealed during cooling, untreated AOM cooled at 6±2° C. for 48 hours in a sealed container, after which time the container lid was removed allowing the pigment direct contact with the cooled atmosphere at 6±2° C./75±5% RH for a further 48 hours. After this time the lid was replaced sealing the container. The cooled AOM pigment was then heat treated at 45±5° C. for 96 hours.
D10=0.80; D50=2.82; D90=6.57; D99=10.35 with distinct monomodal distribution.

Samples 2 to 6 were prepared by placing 25 kg of the pigment into a polyethylene bag which was then put into a 30 L metal pail fitted with a ring and latch lid.

Each of the above 6 AOM pigments was then formulated into a water based flexographic printing ink as follows:
1. Acrylic binder=20%
2. Water=20%
3. Defoamer=1.5%
4. Adhesion promoter=1.5%
5. Diethylene glycol=2%
6. AOM Pigment=55%

Each ink was prepared using a high shear Silverson mixer until a sub 5 micron particle size had been obtained.

Each ink was tested as follows:
1. Initial Zahn Cup number 2 flow at 20° C., measured in seconds.
2. Residual initial ink remaining in Zahn number 2 cup, measured in grams.
3. Reduction factor, amount of water required to reduce ink to print viscosity of 20 seconds, Zahn number 2 flow cup at 20° C., given as a percentage.

Results

| | Initial ink flow Zahn 2 cup at 20° C. (seconds) | Residue from Zahn 2 cup (grams) | Reduction to 20 s Zahn 2 at 20° C. (%) |
|---|---|---|---|
| AOM Pigment Sample 1 - Untreated | 46 | 5.1 | 13.5 |
| AOM Pigment Sample 2 - Fridge treatment only, sealed | 59 | 6.1 | 13.0 |
| AOM Pigment Sample 3 - Fridge treatment only, open | 54 | 5.3 | 12.1 |
| AOM Pigment Sample 4 - Heat treatment only, sealed | 42 | 3.0 | 9.2 |
| AOM Pigment Sample 5 - Fridge and heat, sealed throughout | 40 | 0.9 | 8.5 |
| AOM Pigment Sample 6 - Fridge part sealed/part open, heat treatment sealed | 28 | 0.1 | 4.5 |

CONCLUSIONS

An ideal water based flexographic printing ink would have initial flow at 20-28 seconds Zahn 2 flow cup at 20° C., with essentially negligible residue remaining in the cup and a reduction factor ≤5%.

Both of the cool treatments only had little overall effect.

Heat treatment only significantly improved rheological properties.

Cool and heat treatment, sealed throughout gave a further improvement.

The best rheological properties were obtained by the cooling the pigment in a sealed container but removing the lid to expose the pigment directly to the atmosphere prior to replacing the lid for heat treatment.

The invention claimed is:

1. A method of increasing the particle size of ammonium octamolybdate (AOM) pigment powder, the method comprising the following steps performed in order:
   (a) storing the AOM pigment powder in a sealed container at a temperature (k2) below 10° C. for at least 4 hours;
   (b) exposing the AOM pigment powder to air at the temperature (k2) for at least 4 hours; and
   (c) heating the AOM pigment powder in a sealed container to a temperature (k1) above 30° C. for at least 4 hours.

2. The method according to claim 1 wherein the air has a relative humidity in the range of 40 to 100%.

3. The method according to claim 1, which results in AOM having a D10 particle size of more than 0.4 microns.

4. The method according to claim 1, which results in AOM having a D50 particle size of more than 1.6 microns.

5. The method according to claim 1, which results in AOM having a D90 particle size of more than 5.6 microns.

6. The method according to claim 1, which results in AOM having a D99 particle size of more than 10.0 microns.

7. The method according to claim 1 wherein the AOM produced has a monomodal particle size distribution.

8. A method of producing an ink composition, the method comprising: formulating AOM pigment powder according to the method of claim 1; and incorporating the AOM pigment powder into an ink composition.

9. The method according to claim 8, which improves the rheology of an ink composition by decreasing the viscosity thereof compared to the viscosity before the AOM pigment powder is incorporated into the ink composition.

10. The method according to claim 8 wherein the AOM is incorporated at a level of at least 50% w/w in the ink composition.

11. The method according to claim 8, wherein the ink composition is aqueous.

12. An ink composition obtainable by the method of according to claim 8.

13. The ink composition according to claim 12, which is an aqueous, pad, screen, solvent, or a UV flexo liquid ink formulation.

14. A method for providing an image on a substrate, the method comprising applying to the substrate a composition according to claim 12, followed by irradiation.

15. The method according to claim 14 wherein the substrate is selected from paper, corrugated fiberboard, plastics film, rigid plastic, textiles, glass, metal, foil, foodstuffs, and pharmaceutical preparations.

16. A method comprising producing AOM pigment powder according to the method of claim 1, and then incorporating the AOM pigment powder into a plastics material using a melt processing procedure.

* * * * *